J. WIGHT.
VISE.

No. 174,398. Patented March 7, 1876.

Witnesses;
Grenville Lewis
M. Church

Inventor
James Wight
By Hill & Ellsworth
His Attys.

UNITED STATES PATENT OFFICE.

JAMES WIGHT, OF ROCKLAND, MAINE.

IMPROVEMENT IN VISES.

Specification forming part of Letters Patent No. 174,398, dated March 7, 1876; application filed June 9, 1875.

*To all whom it may concern:*

Be it known that I, JAMES WIGHT, of Rockland, in the county of Knox and State of Maine, have invented an Improved Vise; and I do hereby declare the following to be a full and exact description of the same, reference being had to the accompanying drawings, forming part of this specification, in which—

Figure 2:
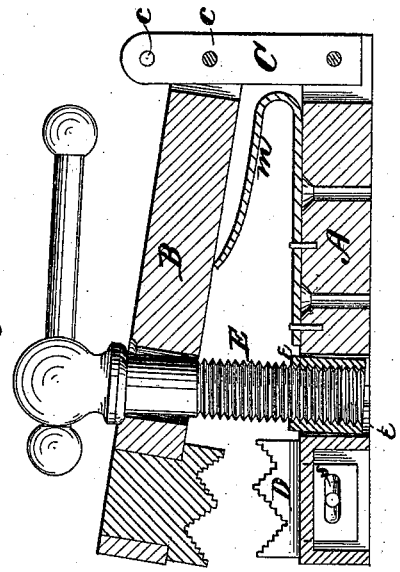
Figure 1:
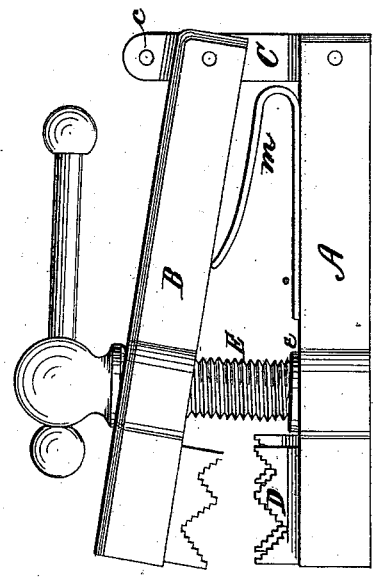

Figure 1 is a side elevation, and Fig. 2 is a longitudinal vertical section.

Similar letters of reference in the accompanying drawings denote the same parts.

My invention is designed more particularly for that class of vises which are employed in operating upon gas and steam pipes, although its mechanical principles, and the devices by which they are embodied, are capable of useful operation in connection with other vises.

The object of the invention is to provide for public use a cheap and durable vise, which can be conveniently operated, and the jaws of which will adjust themselves to the size and shape of the pipe or other article held therein.

To this end the invention consists, first, in pivoting the movable jaw to a yielding bar, or, in other words, in pivoting the jaws together by means of a movable or yielding pivot, which will allow the movable jaw to adjust itself as above referred to; and, secondly, in giving the teeth or serrated griping-plates of one of the jaws a limited longitudinal play upon the jaw to which they are attached.

In the drawings, which represent a horizontal vise, A is the fixed, and B the movable, jaw, the two being articulated together by means of a stout connecting bar or plate, C. The latter is bolted loosely to the jaws, so that it will yield slightly in a direction longitudinal to them, and thereby allow the movable jaw to adjust itself to the article which is to be operated upon. The teeth, or griping plates or blocks D of one of the jaws, are inserted in a longitudinal slot in the jaw, in which they can slide freely to a limited extent, to allow them to adjust themselves to the article which they hold. They may be held in place in the slot by any suitable means; but, for simplicity and convenience of construction, I prefer to employ a slot and bolt, *s*, passing through it, as shown in Fig. 2. The lower end of the screw E, which forces the jaws together, screws into a stout block, *e*, pivoted on trunnions in a suitable recess in the lower jaw, so that the block can adjust itself to the changing inclination of the screw as the jaws are opened or closed. The holes for the screw, through the jaws, are elliptic or oblong, to allow the screw the necessary freedom of movement. A stout spring, *m*, serves to force the jaws apart when the screw is unscrewed.

The advantages of the horizontal vise are, that the handles of the compressing-screw are never in the way of the operator, as is frequently the case with the vertical form of vise; and the whole vise is brought close to the bench and thus held more firmly by its fastenings. The connecting-bar C is provided with a series of holes, *c c*, so that the jaws can be pivoted at greater or less distances from each other, according to the size of the articles to be held, thus keeping them substantially parallel, and enabling them to take a firm hold of the article to be operated upon. The movable plates or blocks D of the fixed jaw adjust themselves to the position of the pipe or other article as it is slightly displaced by the approaching upper jaw, thus enabling both jaws to gripe it firmly and hold it steadily between them.

Having thus described my invention I claim as new—

1. In a vise, the combination of the jaws A B and loosely-articulated bar C, substantially as described.

2. The combination of the griping plates or blocks D, having a limited sliding movement in their beds, with the jaws A B, and loosely-articulated bar C, substantially as described, for the purpose specified.

JAMES WIGHT.

Witnesses:
J. P. CILLEY,
J. G. LOVEJOY.